US012607232B2

(12) United States Patent
Gurvich et al.

(10) Patent No.: US 12,607,232 B2
(45) Date of Patent: Apr. 21, 2026

(54) FLEXIBLE METALLIC COUPLING FOR DRIVE SHAFTS MADE BY ADDITIVE MANUFACTURING

(71) Applicant: Goodrich Corporation, Charlotte, NC (US)

(72) Inventors: Mark R. Gurvich, Middletown, CT (US); Jeffrey L. Mathis, Rome, NY (US); Michael J. King, Sauquoit, NY (US); Brayton Reed, New York Mills, NY (US)

(73) Assignee: GOODRICH CORPORATION, Charlotte, NC (US)

( * ) Notice: Subject to any disclaimer, the term of this patent is extended or adjusted under 35 U.S.C. 154(b) by 368 days.

(21) Appl. No.: 18/190,666

(22) Filed: Mar. 27, 2023

(65) Prior Publication Data

US 2024/0328464 A1    Oct. 3, 2024

(51) Int. Cl.
 *F16D 3/56*        (2006.01)
(52) U.S. Cl.
 CPC ...................................... *F16D 3/56* (2013.01)
(58) Field of Classification Search
 CPC ......................................................... F16D 3/56
 USPC ................................. 464/58, 81, 85–86, 137
 See application file for complete search history.

(56) References Cited

U.S. PATENT DOCUMENTS

| | | | |
|---|---|---|---|
| 306,472 A | 10/1884 | Feith | |
| 3,192,795 A | * 7/1965 | Pierce | ...................... H01B 7/04 |

| | | | |
|---|---|---|---|
| 3,791,898 A | * 2/1974 | Remi | ...................... E21B 17/20 |
| | | | 464/58 |
| 4,560,364 A | * 12/1985 | Cohen | ...................... F16D 3/72 |
| 4,863,416 A | * 9/1989 | Gupta | ...................... B29C 53/58 |
| 5,167,582 A | 12/1992 | Hunt | |
| 6,514,146 B1 | 2/2003 | Shinozuka | |

(Continued)

FOREIGN PATENT DOCUMENTS

| | | | | |
|---|---|---|---|---|
| GB | 391004 | * 4/1933 | ...................... | 464/81 |
| SU | 601485 | * 4/1978 | ...................... | 464/81 |
| WO | 2016199973 A1 | 12/2016 | | |

OTHER PUBLICATIONS

Extended European Search Report dated Oct. 25, 2024, for corresponding European Patent Application No. 24166922.5, 10 pgs.

*Primary Examiner* — Greg Binda
(74) *Attorney, Agent, or Firm* — Kinney & Lange, P.A.

(57)        ABSTRACT

A metallic coupling for a drive shaft includes a first cylindrical flange extending axially along a center axis and a second cylindrical flange extending axially along the center axis and spaced axially from the first cylindrical flange. The metallic coupling also includes a first plurality and a second plurality of connectors. Each connector of the first plurality of connectors extends from the first cylindrical flange to the second cylindrical flange and are spaced circumferentially apart from each other about the center axis. Each connector of the second plurality of connectors also extends from the first cylindrical flange to the second cylindrical flange and are spaced circumferentially apart from each other about the center axis. The second plurality of connectors are radially inward from the first plurality of connectors relative to the center axis. An annular gap is radially between the first plurality of connectors and the second plurality of connectors.

20 Claims, 7 Drawing Sheets

(56)            References Cited

U.S. PATENT DOCUMENTS

| | | | |
|---|---|---|---|
| 11,408,478 | B2 | 8/2022 | Vitello et al. |
| 12,123,458 | B2 * | 10/2024 | Gurvich ................. F16C 3/026 |
| 2006/0281566 | A1 | 12/2006 | Lee |
| 2017/0082137 | A1 | 3/2017 | Narayanan Nampy et al. |
| 2019/0128334 | A1 | 5/2019 | Pollitt |
| 2020/0347875 | A1 | 11/2020 | Kielbowicz et al. |

* cited by examiner

FLEXIBLE METALLIC COUPLING FOR DRIVE SHAFTS MADE BY ADDITIVE MANUFACTURING

BACKGROUND

This disclosure relates to couplings, and in particular, to couplings for drive shafts.

In addition to various other requirements, drive shafts in aircraft must provide two conflicting structural responses. First, drive shafts must be stiff and strong under torque, but secondly, drive shafts must also be flexible under axial and bending deformations. Current methods to resolve this dilemma are usually resolved by couplings, such as diaphragm couplings, installed at both ends of a cylindrical shaft body. These couplings can be relatively expensive due to very demanding requirements of high-precision fabrication and high-quality welding. Alternative couplings that are less expensive are desired.

SUMMARY

A metallic coupling for a drive shaft includes a first cylindrical flange extending axially along a center axis and a second cylindrical flange extending axially along the center axis and spaced axially from the first cylindrical flange. The metallic coupling also includes a first plurality of connectors and a second plurality of connectors. Each connector of the first plurality of connectors extends from the first cylindrical flange to the second cylindrical flange. The connectors of the first plurality of connectors are spaced circumferentially apart from each other about the center axis. Each connector of the second plurality of connectors extends from the first cylindrical flange to the second cylindrical flange. The connectors of the second plurality of connectors are spaced circumferentially apart from each other about the center axis. The second plurality of connectors are radially inward from the first plurality of connectors relative to the center axis. An annular gap positioned radially between the first plurality of connectors and the second plurality of connectors.

A coupling for a drive shaft includes a first cylindrical flange extending axially along a center axis and a second cylindrical flange extending axially along the center axis and spaced axially from the first cylindrical flange. The coupling includes a first layer of connectors and a second layer of connectors. Each connector in the first layer extends from the first cylindrical flange to the second cylindrical flange. The connectors in the first layer are spaced circumferentially apart from each other about the center axis. The connectors of the first layer spiral circumferentially in a first direction about the center axis as the connectors of the first layer extend from the first cylindrical flange to the second cylindrical flange. Each connector in the second layer extends from the first cylindrical flange to the second cylindrical flange. The connectors in the second layer are spaced circumferentially apart from each other about the center axis. The second layer of connectors is spaced radially inward from the first layer of connectors relative to the center axis. The connectors of the second layer spiral circumferentially in a second direction about the center axis as the connectors in the second layer extend from the first cylindrical flange to the second cylindrical flange. The second direction is symmetric to the first direction relative to the center axis.

A method of manufacturing a coupling is disclosed. The method includes forming a first cylindrical flange extending axially along a center axis. A first plurality of connectors is additively manufactured onto the first cylindrical flange in a build direction parallel to the center axis such that each connector of the first plurality of connectors spirals in a first direction relative to the center axis. A second plurality of connectors is additively manufactured onto the first cylindrical flange in the build direction such that each connector of the second plurality of connectors spirals in a second direction relative to the center axis. The second direction is symmetrical to the first direction. Each connector of the first plurality of connectors and each connector of the second plurality of connectors is connected to a second cylindrical flange.

Figures 1A, 1B:
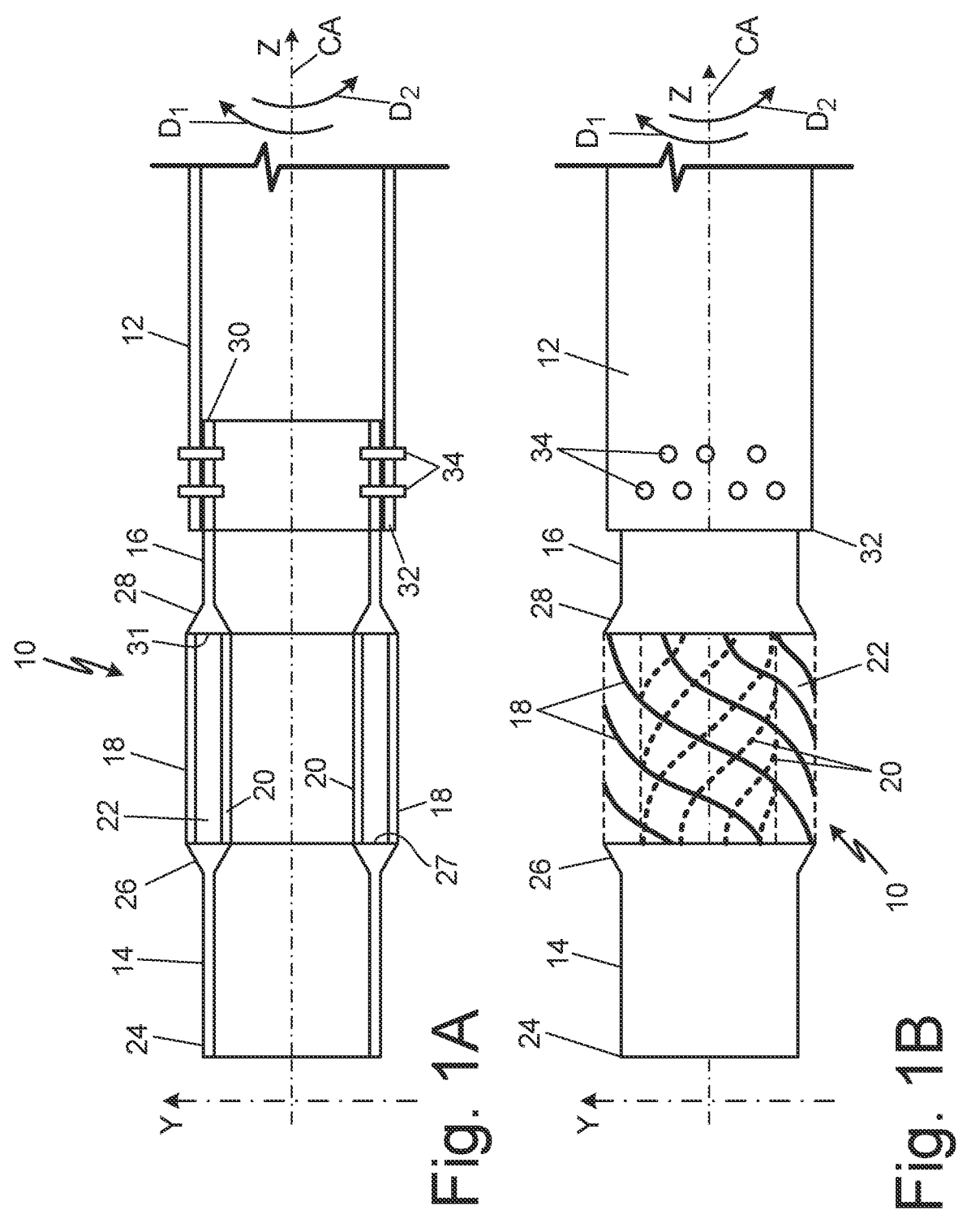
FIG. 1A is an axial cross-sectional view of a shaft connected to a coupling that includes a first layer of connectors and a second layer of connectors.
FIG. 1B is a side view of the coupling of FIG. 1A.

While the above-identified drawing figures set forth one or more examples, other examples are also contemplated. It should be understood that numerous other modifications and examples can be devised by those skilled in the art, which fall within the scope and spirit of the principles of the claims. The figures may not be drawn to scale, and applications and examples may include features and components not specifically shown in the drawings.

DETAILED DESCRIPTION

A metallic coupling is disclosed that includes a first layer of connectors and a second layer of connectors both extending axially from a first cylindrical flange to a second cylindrical flange relative to a center axis of the metallic coupling. A gap is formed radially between the first layer and the second layer relative to the center axis. The connectors in each layer are spaced apart from each other circumferentially about a center axis of the metallic coupling. The connectors in each layer also angle and/or curve and spiral circumferentially about the center axis of the metallic coupling as the connectors extend axially from the first cylindrical flange to the second cylindrical flange. The connectors in each layer form an angle relative to the central axis. The angle for each connector in one layer is within a positive 35 degrees and positive 55 degrees relative to the center axis. The angle for each connector in the other layer is within a negative 35 degrees and negative 55 degrees relative to the center axis. The angles of the connectors allow the metallic coupling to be stiff and strong under torque. The spiral arrangement of the connectors in the circumferential direction give the metallic coupling axial flexibility and bending flexibility. The metallic coupling is discussed in greater detail below with reference to FIGS. 1-6B.

Figures 2A, 2B:
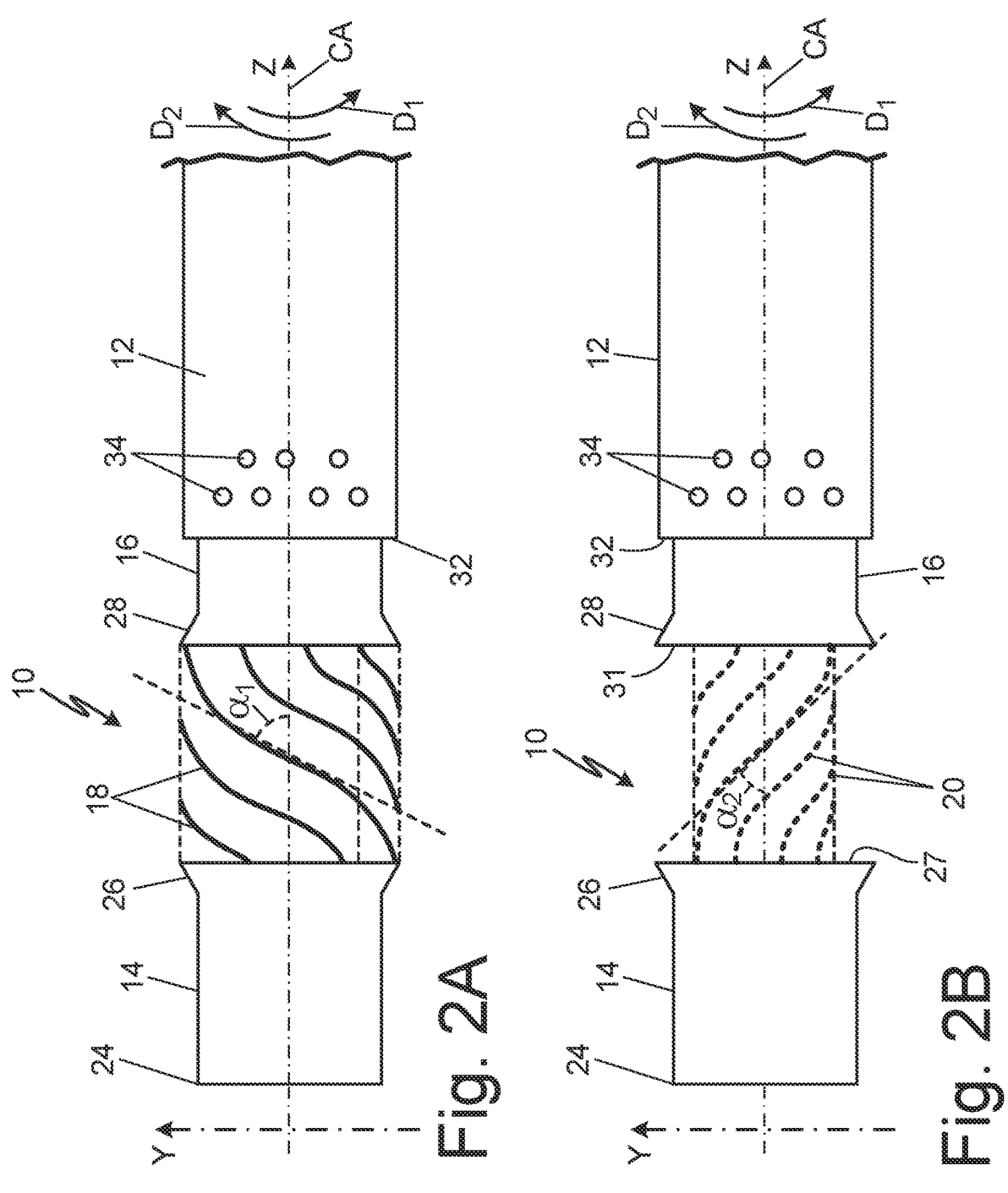
FIG. 2A is a side view of the coupling of FIGS. 1A and 1B with the second layer of connectors removed from view.
FIG. 2B is a side view of the coupling of FIGS. 1A and 1B with the first layer of connectors removed from view.

FIGS. 1A-2B will be discussed concurrently. FIG. 1A is a cross-sectional view of coupling 10 and shaft 12. FIG. 1B is a side view of coupling 10 and shaft 12. As shown in FIGS. 1A and 1B, coupling 10 includes first cylindrical flange 14, second cylindrical flange 16, a first plurality of connectors 18, a second plurality of connectors 20, and annular gap 22. First cylindrical flange 14 includes first end 24, second end 26, and first interface 27. Second cylindrical flange 16 includes first end 28, second end 30, and second interface 31. Shaft 12 includes first end 32 connected to second cylindrical flange 16 by fasteners 34. FIG. 2A is a side view of coupling 10 from FIG. 1B with the second plurality of connectors 20 removed from view. FIG. 2B is a side view of the coupling 10 from FIG. 1B with the first plurality of connectors 18 removed from view.

First cylindrical flange 14 extends axially along center axis CA from first end 24 to second end 26. In the example of FIGS. 1A and 1B, first cylindrical flange 14 is a tubular cylinder formed from metal that extends axially along center axis CA and extends circumferentially around center axis CA. Second end 26 of first cylindrical flange 14 can be thicker than first end 24 of first cylindrical flange 14 to accommodate first interface 27. First interface 27 is where the first plurality of connectors 18 and the second plurality of connectors 20 join second end 26 of first cylindrical flange 14. Second cylindrical flange 16 extends axially along center axis CA from first end 28 to second end 30. In the example of FIGS. 1A and 1B, second cylindrical flange 16 is also a tubular cylinder formed from metal that extends axially along center axis CA and extends circumferentially around center axis CA. First end 28 of second cylindrical flange 16 can be thicker than second end 30 of second cylindrical flange 16 to accommodate second interface 31. Second interface 31 is where the first plurality of connectors 18 and the second plurality of connectors 20 join first end 28 of second cylindrical flange 16.

First cylindrical flange 14 and second cylindrical flange 16 can slide telescopically within or over a drive shaft for connection to the drive shaft. In the example of FIGS. 1A and 1B, second cylindrical flange 16 is received into a central cavity of tubular shaft 12 and is connected to shaft 12 by fasteners 34. Shaft 12 can be formed of a composite material, metal, or alloy. First cylindrical flange 14 and second cylindrical flange 16 are spaced axially apart from one another in an axial direction parallel to center axis CA. The first plurality of connectors 18 and the second plurality of connectors 20 extend axially from first interface 27 on second end 26 of first cylindrical flange 14 to second interface 31 on first end 28 of second cylindrical flange 16. The first plurality of connectors 18 and the second plurality of connectors 20 are formed of metal or alloy. The first plurality of connectors 18 form a first layer of connectors that connect first cylindrical flange 14 to second cylindrical flange 16. Each connector 18 of the first plurality of connectors 18 extends from second end 26 of first cylindrical flange 14 to first end 28 of second cylindrical flange 16. As shown in FIG. 1B, connectors 18 are spaced circumferentially apart from each other about center axis CA.

The second plurality of connectors 20 form a second layer of connectors that connect first cylindrical flange 14 to second cylindrical flange 16. Each connector 20 of the second plurality of connectors 20 extends from second end 26 of first cylindrical flange 14 to first end 28 of second cylindrical flange 16. As shown in FIG. 1B, connectors 20 of the second plurality of connectors 20 are spaced circumferentially apart from each other about center axis CA. The second plurality of connectors 20 are radially inward from the first plurality of connectors 18 relative to center axis CA. Annular gap 22 is positioned radially between the first plurality of connectors 18 and the second plurality of connectors 20. The second plurality of connectors 20 can differ in number of connectors from the first plurality of connectors 18. Connectors 20 can also have a different thickness or cross-sectional area than connectors 18. Each connector of the first plurality of connectors 18 and the second plurality of connectors 20 can have a uniform cross-section or a non-uniform cross-section as connectors 18 and 20 extend from first cylindrical flange 14 to second cylindrical flange 16.

As shown best in FIG. 2A, each connector 18 of the first plurality of connectors 18 is arranged spirally in a first spiral direction $D_1$ about center axis CA as each connector 18 of the first plurality of connectors 18 extends from first cylindrical flange 14 to second cylindrical flange 16. In the example of FIGS. 1A-2B, the first direction $D_1$ is a counterclockwise direction about center axis CA while following center axis CA from first cylindrical flange 14 to second cylindrical flange 16. As shown best in FIG. 2B, each connector 20 of the second plurality of connectors 20 is arranged spirally in a second spiral direction $D_2$ about center axis CA as each connector 20 of the second plurality of connectors 20 extends from first cylindrical flange 14 to second cylindrical flange 16. In the example of FIGS. 1A-2B, the second direction $D_2$ is a clockwise direction about center axis CA while following center axis CA from first cylindrical flange 14 to second cylindrical flange 16. By arranging connectors 18 and connectors 20 in symmetric directions from each other with respect to the center axis CA, the first plurality of connectors 18 and the second plurality of connectors 20 together resist twisting under torsional loads. While being stiff under torsional loads, the curvature of connectors 18 and 20 in the circumferential direction allows connectors 18 and 20 to flex in the axial direction along center axis CA and to bend relative to center axis CA.

When viewing coupling 10 on plane Y-Z, which is a plane parallel to center axis CA, connectors 18 of the first plurality of connectors 18 extend from first cylindrical flange 14 to second cylindrical flange 16 at first angle $\alpha_1$ relative to center axis CA. To best resist torsional twisting when shaft 12 and coupling 10 are rotated in the second direction $D_2$, first angle $\alpha_1$ is within positive 35 degrees and positive 55 degrees relative to center axis CA. In the example of FIG. 2A, first angle $\alpha_1$ is positive and approximately 45 degrees relative to center axis CA. While viewing coupling 10 on plane Y-Z, connectors 20 of the second plurality of connectors 20 extend from first cylindrical flange 14 to second cylindrical flange 16 at second angle $\alpha_2$ relative to center axis CA. To best resist torsional twisting when shaft 12 and coupling 10 are rotated in the first direction $D_1$, second angle $\alpha_2$ is within negative 35 degrees and negative 55 degrees relative to center axis CA. In the example of FIG. 2B, second angle $\alpha_2$ is negative and approximately 45 degrees relative to center axis CA. To generate the curvature and angle of connectors 18 and connectors 20, coupling 10 can be additively manufactured (AM), as shown in FIG. 3.

Figure 3:
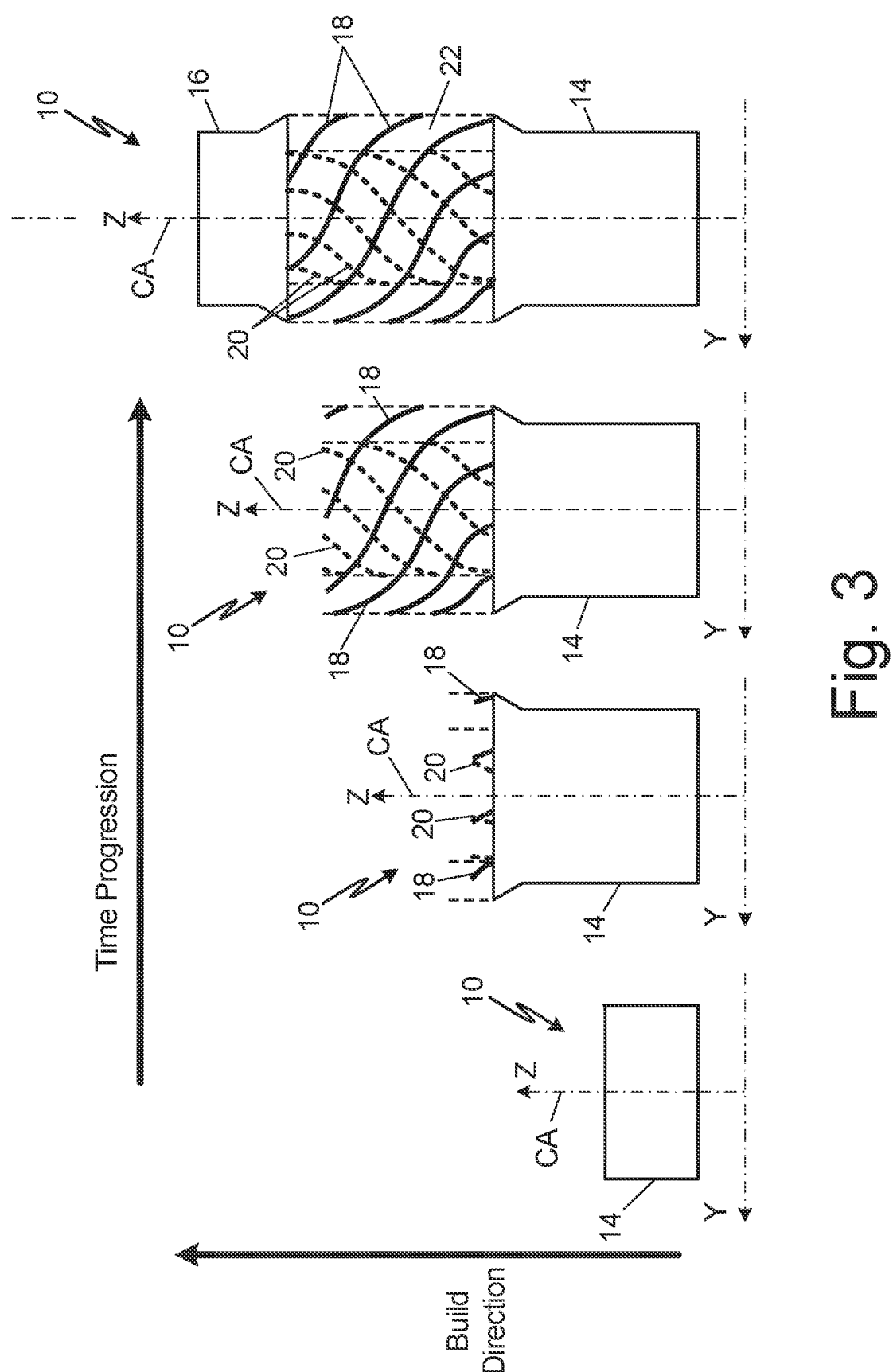
FIG. 3 is a diagram showing a method of forming the coupling of FIGS. 1A and 1B through additive manufacturing in a form of sequence of representative key stages.

FIG. 3 is a diagram showing method of forming coupling 10 of FIGS. 1A-2B through additive manufacturing. All of coupling 10 can be metal and formed using laser metal deposition or any other additive manufacturing process for producing metal parts with complex geometries. Since all of coupling 10 can be formed using laser metal deposition, first cylindrical flange 14 and second cylindrical flange 16 can both be integral with connectors 18 and connectors 20. In the example of FIG. 3, central axis CA is the build direction for coupling 10. First cylindrical flange 14 is first formed, followed by connectors 18 and connectors 20. Second cylindrical flange 16 is formed after connectors 18 and connectors 20. In another example, first cylindrical flange 14 can be made through another process, such as machining or extrusion, and then loaded into an additive manufacturing machine to add connectors 18, connectors 20, and second cylindrical flange 16 to first cylindrical flange 14. In another example, first cylindrical flange 14 can be made through another process, such as machining or extrusion, and then loaded into an additive manufacturing machine to add connectors 18 and connectors 20 to first cylindrical flange 14, such that connectors 18 and connectors 20 are integral with first cylindrical flange 14. After connectors 18 and connectors 20 have been added to first cylindrical flange 14, second cylindrical flange 16 can be welded to connectors 18 and connectors 20 opposite first cylindrical flange 14. Coupling 10 can be used on any drive shaft where flexibility is needed. For example, as shown in FIG. 4, coupling 10 can be used on a drive shaft in a powertrain of a helicopter.

Figure 4:
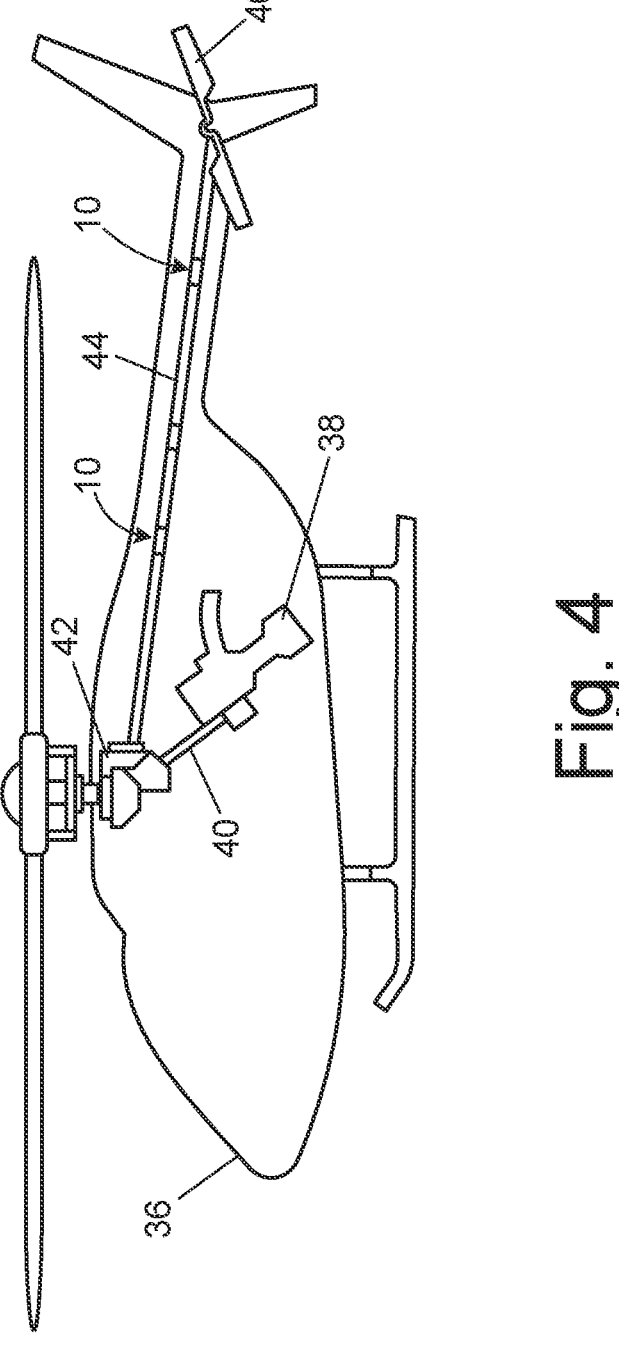
FIG. 4 is a schematic drawing of a helicopter with a driveshaft that includes at least one coupling.

FIG. 4 is a schematic sectional view of a driveshaft that includes coupling 10. FIG. 4 shows helicopter 36, engine 38, drive shaft 40, tail rotor reduction gear 42, tail rotor drive shaft 44, and tail rotor 46. Helicopter 36 includes engine 38. Engine 38 turns drive shaft 40, which in turn rotates tail rotor reduction gear 42 and tail rotor drive shaft 44. Tail rotor driveshaft 44 turns tail rotor 46. Tail rotor driveshaft 44 includes at least one coupling 10. Coupling 10 allows tail rotor drive shaft 44 to transfer torque from tail rotor reduction gear 42 to tail rotor 46 while also providing a location for axial flexibility and bending flexibility between tail rotor reduction gear 42 to tail rotor 46. Coupling 10 allows for axial flexibility and bending flexibility so that stresses do not build in tail rotor drive shaft 44. In other examples coupling 10 can be used to connect drive shaft 40 to engine 38 and/or tail rotor reduction gear 42. Coupling 10 can also be used in drive shafts of gas turbine engines on airplanes, or in drive trains of ground vehicles, such as tanks or automobiles.

Figure 5A:
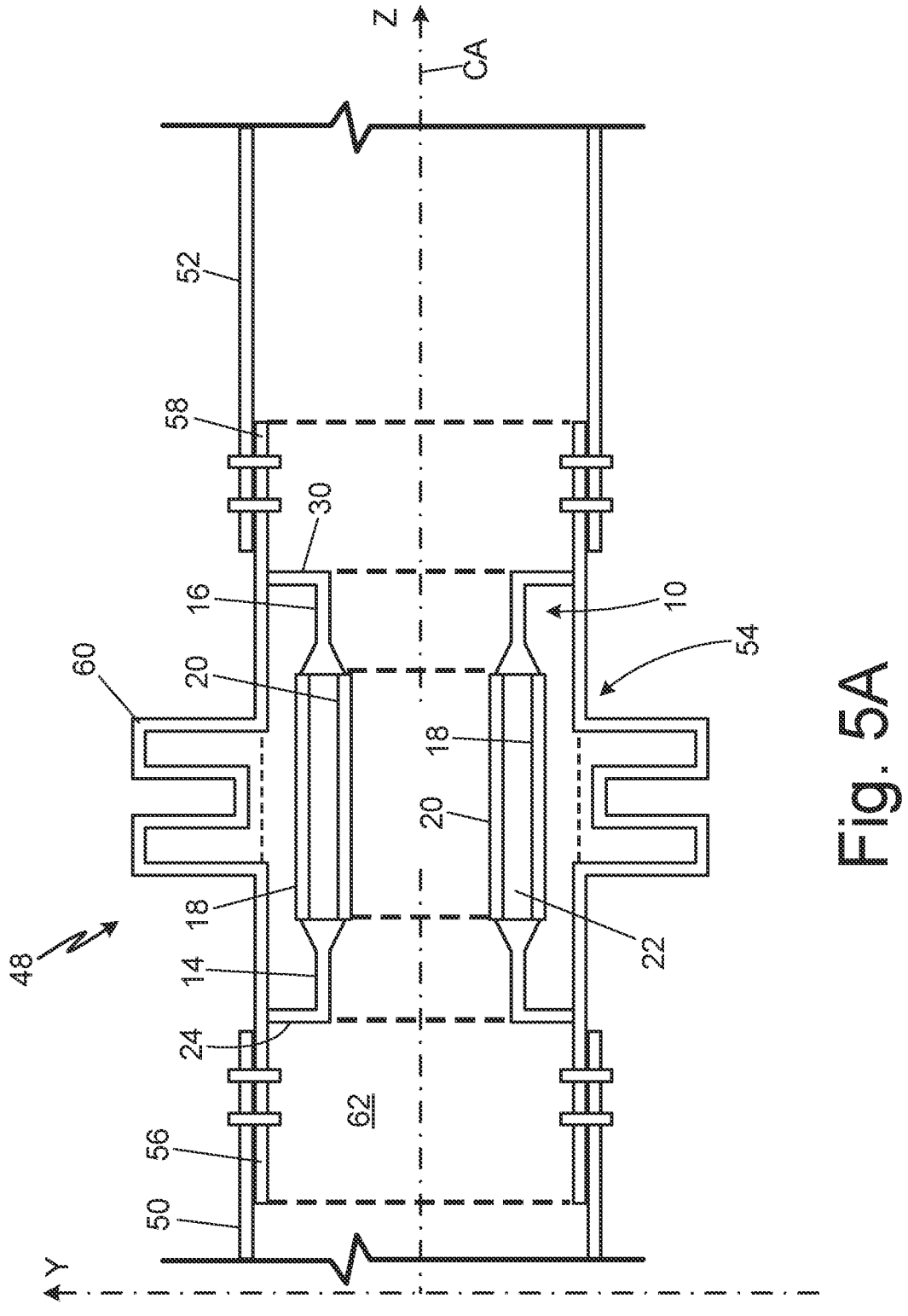
FIG. 5A is an axial cross-sectional view of a coupling with redundancy.
Figure 5B:
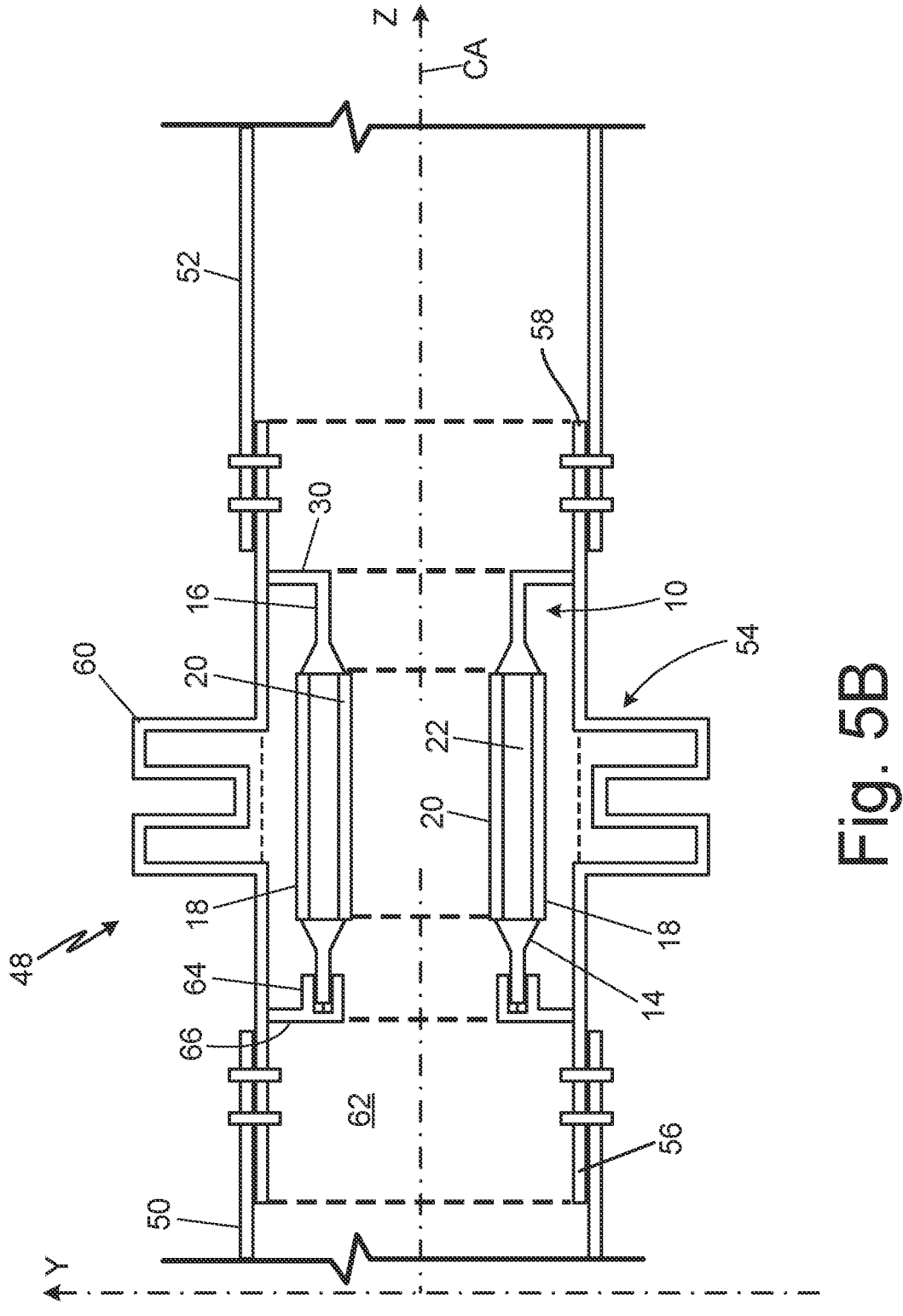
FIG. 5B is an axial cross-sectional view of another coupling with redundancy.

FIGS. 5A and 5B each disclose an example redundant coupling 48 that incorporates coupling 10 described above with reference to FIGS. 1A-2B. FIG. 5A is a cross-sectional view of redundant coupling 48. As shown in FIG. 5A, redundant coupling 48 includes coupling 10 inside of bellows coupling 54. Bellows coupling 54 is fastened to first shaft 50 and second shaft 52. Bellows coupling 54 includes first tubular hub 56, second tubular hub 58, and metal bellows 60. First tubular hub 56 extends on center axis CA and second tubular hub 58 also extends on center axis CA. Metal bellows 60 extends axially from first tubular hub 56 to second tubular hub 58. Metal bellows 60 extends circumferentially around the first plurality of connectors 18 and the second plurality of connectors 20. First cylindrical flange 14 is connected to first tubular hub 56. Second cylindrical flange 16 is connected to second tubular hub 58. During operation, both metal bellows 60, the first plurality of connectors 18, and the second plurality of connectors 20 are able to bend relative to center axis CA and/or axially stretch or compress relative to center axis CA. Should metal bellows 60 fail, the first plurality of connectors 18 and the second plurality of connectors 20 will continue to transfer torque between first shaft 50 and second shaft 52 while also providing axial and bending flexibility between first shaft 50 and second shaft 52.

FIG. 5B is a cross-sectional view of another example of a coupler with redundance 48 similar to the example of FIG. 5A with the addition of axial joint 64. Axial joint 64 is formed on an end of first cylindrical flange 14 of coupling 10 and is connected to first tubular hub 56 of bellows coupling 54 by radial flange 66. Axial joint 64 includes teeth that slide axially relative to one another relative center axis CA, but intermesh or interlock circumferentially around center axis CA so that toque can be transferred through axial joint 64.

Figures 6A, 6B:
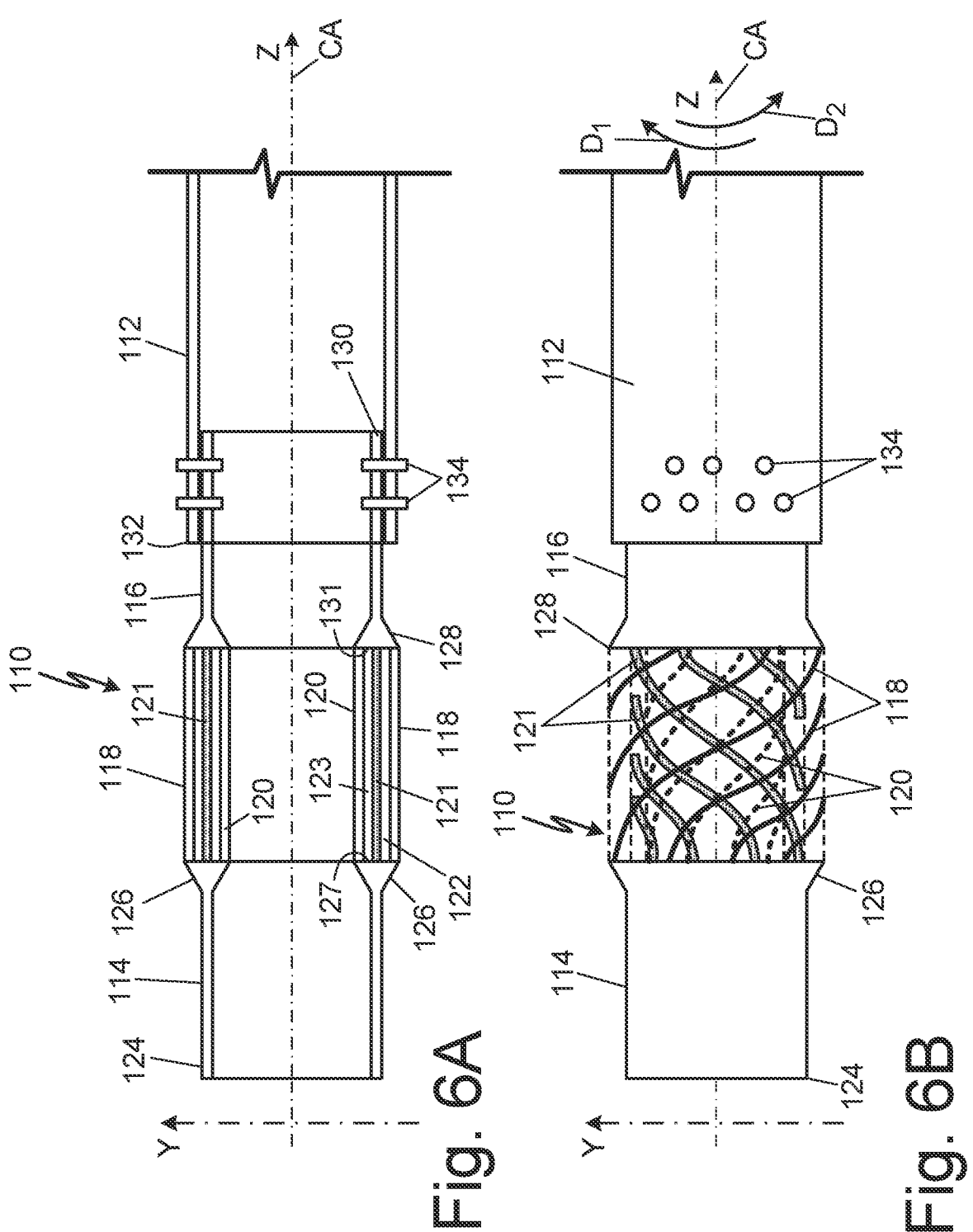
FIG. 6A is an axial cross-sectional view of a shaft connected to a coupling that includes a first layer of connectors, a second layer of connectors, and a third layer of connectors.
FIG. 6B is a side view of the coupling of FIG. 6A.

FIGS. 6A and 6B disclose another example coupling and will be discussed concurrently. FIG. 6A is a cross-sectional view of coupling 110 and shaft 112. FIG. 6B is a side view of coupling 110 and shaft 112. As shown in FIGS. 6A and 6B, coupling 110 includes first cylindrical flange 114, second cylindrical flange 116, a first plurality of connectors 118, a second plurality of connectors 120, a third plurality connectors 121, first annular gap 122, and second annular gap 123. First cylindrical flange 114 includes first end 124, second end 126, and first interface 127. Second cylindrical flange 116 includes first end 128, second end 130, and second interface 131. Shaft 112 includes first end 132 connected to second cylindrical flange 116 by fasteners 134.

First cylindrical flange 114 extends axially along center axis CA from first end 124 to second end 126. In the example of FIGS. 6A and 6B, first cylindrical flange 114 is a tubular cylinder formed from metal that extends axially along center axis CA and extends circumferentially around center axis CA. Second end 126 of first cylindrical flange 114 can be thicker than first end 124 of first cylindrical flange 114 to accommodate first interface 127. First interface 127 is where the first plurality of connectors 118, the second plurality of connectors 120, and the third plurality of connectors 121 join second end 126 of first cylindrical flange 114. Second cylindrical flange 116 extends axially along center axis CA from first end 128 to second end 130. In the example of FIGS. 6A and 6B, second cylindrical flange 116 is also a tubular cylinder formed from metal that extends axially along center axis CA and extends circumferentially around center axis CA. First end 128 of second cylindrical flange 116 can be thicker than second end 130 of second cylindrical flange 116 to accommodate second interface 131. Second interface 131 is where the first plurality of connectors 118, the second plurality of connectors 120, and the third plurality of connectors 121 join first end 128 of second cylindrical flange 116.

First cylindrical flange 114 and second cylindrical flange 116 can slide telescopically within or over a drive shaft for connection to the drive shaft. In the example of FIGS. 6A and 6B, second cylindrical flange 116 is received into a central cavity of tubular shaft 112 and is connected to shaft 112 by fasteners 134. Shaft 112 can be formed of a composite material or from metal. First cylindrical flange 114 and second cylindrical flange 116 are spaced axially apart from one another in an axial direction parallel to center axis CA. The first plurality of connectors 118, the second plurality of connectors 120, and the third plurality of connectors 121 extend axially from first interface 127 on second end 126 of first cylindrical flange 114 to second interface 131 on first end 128 of second cylindrical flange 116. The first plurality of connectors 118, the second plurality of connectors 120, and the third plurality of connectors 121 are formed of metal. The first plurality of connectors 118 form a first layer of connectors that connect first cylindrical flange 114 to second cylindrical flange 116. Each connector 118 of the first plurality of connectors 118 extends from second end 126 of first cylindrical flange 114 to first end 128 of second cylindrical flange 116. As shown in FIG. 6B, connectors 118 are spaced circumferentially apart from each other about center axis CA.

The second plurality of connectors 120 form a second layer of connectors that connect first cylindrical flange 114 to second cylindrical flange 116. Each connector 120 of the second plurality of connectors 120 extends from second end 126 of first cylindrical flange 114 to first end 128 of second cylindrical flange 116. As shown in FIG. 6B, connectors 120 of the second plurality of connectors 120 are spaced circumferentially apart from each other about center axis CA. The second plurality of connectors 120 are radially inward from the first plurality of connectors 118 relative to center axis CA.

The third plurality of connectors 121 form a third and center layer of connectors that connect first cylindrical flange 114 to second cylindrical flange 116. Each connector 121 of the third plurality of connectors 121 extends from second end 126 of first cylindrical flange 114 to first end 128 of second cylindrical flange 116. As shown in FIG. 6B, connectors 121 of the third plurality of connectors 121 are spaced circumferentially apart from each other about center axis CA. The third plurality of connectors 121 are radially inward from the first plurality of connectors 118 and radially outward from the second plurality of connectors 120 relative to center axis CA. First annular gap 122 is positioned radially between the first plurality of connectors 118 and the third plurality of connectors 121. Second annular gap 123 is positioned radially between the second plurality of connectors 120 and the third plurality of connectors 121. The first plurality of connectors 118 and the second plurality of connectors 120 can differ in number of connectors from the third plurality of connectors 121. The first plurality of connectors 118 can also have a different number of connectors from the second plurality of connectors 120. Connectors 118 and 120 can also have a different thickness or cross-sectional area than connectors 121. In the example of FIGS. 6A and 6B, connectors 121 are thicker and stiffer than both connectors 118 and connectors 120. Each connector of the first plurality of connectors 118, the second plurality of connectors 120, and the third plurality of connectors 121 can have a uniform cross-section or a non-uniform cross-section as connectors 118, 120, and 121 extend from first cylindrical flange 114 to second cylindrical flange 116.

As shown best in FIG. 6B, each connector 121 of the third plurality of connectors 121 curves circumferentially in a first direction $D_1$ about center axis CA as each connector 121 of the third plurality of connectors 121 extends from first cylindrical flange 114 to second cylindrical flange 116. In the example of FIGS. 6A and 6B, the first direction $D_1$ is a counter-clockwise direction about center axis CA while following center axis CA from first cylindrical flange 114 to second cylindrical flange 116. Each connector 118 of the first plurality of connectors 118 curves circumferentially in a second direction $D_2$ about center axis CA as each connector 118 of the first plurality of connectors 118 extends from first cylindrical flange 114 to second cylindrical flange 116. In the example of FIGS. 6A and 6B, the second direction $D_2$ is a clockwise direction about center axis CA while following center axis CA from first cylindrical flange 114 to second cylindrical flange 116. Each connector 120 of the second plurality of connectors 120 also curves circumferentially in the second direction $D_2$ about center axis CA as each connector 120 of the second plurality of connectors 120 extends from first cylindrical flange 114 to second cylindrical flange 116. By curving the first plurality of connectors 118 and the second plurality of connectors 120 in an opposite direction from the third plurality of connectors 121, the first plurality of connectors 118, the second plurality of connectors 120, and the third plurality of connectors 121 resist twisting under torsional loads. While being stiff under torsional loads, the curvature of connectors 118, 120, and 121 in the circumferential direction allows connectors 118, 120, and 121 to flex in the axial direction along center axis CA and to bend relative to center axis CA.

When viewing coupling 110 on plane Y-Z, which is a plane parallel to center axis CA, connectors 118 of the first plurality of connectors 118 extend from first cylindrical flange 114 to second cylindrical flange 116 at first angle $\alpha_1$ relative to center axis CA. While viewing coupling 110 on plane Y-Z, connectors 120 of the second plurality of connectors 120 extend from first cylindrical flange 114 to second cylindrical flange 116 at second angle $\alpha_2$ relative to center axis CA. To best resist torsional twisting when shaft 112 and coupling 110 are rotated in the first direction $D_1$, first angle $\alpha_2$ and second angle $\alpha_2$ are each within negative 35 degrees and negative 55 degrees relative to center axis CA. While viewing coupling 110 on plane Y-Z, connectors 121 of the third plurality of connectors 121 extend from first cylindrical flange 114 to second cylindrical flange 116 at third angle $\alpha_3$ relative to center axis CA. To best resist torsional twisting when shaft 112 and coupling 110 are rotated in the second direction $D_2$, third angle $\alpha_3$ is within positive 35 degrees and positive 55 degrees relative to center axis CA. In the example of FIG. 6B, third angle $\alpha_3$ is positive and approximately 45 degrees relative to center axis CA.

Discussion of Possible Embodiments

The following are non-exclusive descriptions of possible embodiments of the present invention.

In one example, a metallic coupling for a drive shaft includes a first cylindrical flange extending axially along a center axis and a second cylindrical flange extending axially along the center axis and spaced axially from the first cylindrical flange. The metallic coupling also includes a first plurality of connectors and a second plurality of connectors. Each connector of the first plurality of connectors extends from the first cylindrical flange to the second cylindrical flange. The connectors of the first plurality of connectors are spaced circumferentially apart from each other about the center axis. Each connector of the second plurality of connectors extends from the first cylindrical flange to the second cylindrical flange. The connectors of the second plurality of connectors are spaced circumferentially apart from each other about the center axis. The second plurality of connectors are radially inward from the first plurality of connectors relative to the center axis. An annular gap positioned radially between the first plurality of connectors and the second plurality of connectors.

The metallic coupling of the preceding paragraph can optionally include, additionally and/or alternatively, any one or more of the following features, configurations and/or additional components:

the connectors of the first plurality of connectors are arranged spirally in a first spiral direction about the center axis as the connectors of the first plurality of connectors extend from the first cylindrical flange to the second cylindrical flange;

the connectors of the second plurality of connectors are arranged spirally in a second spiral direction about the center axis as the connectors of the second plurality of connectors extend from the first cylindrical flange to the second cylindrical flange, and wherein the second direction is symmetric with respect to the first direction relative to the center axis;

the connectors of the first plurality of connectors extend from the first cylindrical flange to the second cylindrical flange at a first angle relative to the center axis;

the connectors of the second plurality of connectors extend from the first cylindrical flange to the second cylindrical flange at a second angle relative to the center axis;

the first angle is within positive 35 degrees and positive 55 degrees relative to the center axis;

the second angle is within negative 35 degrees and negative 55 degrees relative to the center axis;

the first angle is positive 45 degrees and the second angle is negative 45 degrees;

a third plurality of connectors, wherein each connector of the third plurality of connectors extends from the first cylindrical flange to the second cylindrical flange, the connectors of the third plurality of connectors are spaced circumferentially apart from each other about the center axis, wherein the third plurality of connectors are radially inward from the first plurality of connectors relative to the center axis, and wherein the third plurality of connectors are radially outward from the second plurality of connectors relative to the center axis; and a second annular gap positioned radially between the second plurality of connectors and the third plurality of connectors, and wherein the annular gap is positioned radially between the first plurality of connectors and the third plurality of connectors;

the connectors of the third plurality of connectors are arranged spirally in a first spiral direction about the center axis as the connectors of the third plurality of connectors extend from the first cylindrical flange to the second cylindrical flange, wherein the connectors of the first plurality of connectors are arranged spirally in a second spiral direction about the center axis as the connectors of the first plurality of connectors extend from the first cylindrical flange to the second cylindrical flange, and wherein the second direction is opposite to the first direction about the center axis;

the connectors of the second plurality of connectors are arranged spirally in the second spiral direction about the center axis as the connectors of the second plurality of connectors extend from the first cylindrical flange to the second cylindrical flange;

the connectors of the first plurality of connectors extend from the first cylindrical flange to the second cylindrical flange at a first angle relative to the center axis, wherein the connectors of the second plurality of connectors extend from the first cylindrical flange to the second cylindrical flange at a second angle relative to the center axis, and wherein the connectors of the third plurality of connectors extend from the first cylindrical flange to the second cylindrical flange at a third angle relative to the center axis;

the first angle and the second angle both have the same sign relative to the center axis, and wherein the third angle has a sign opposite to the first angle and the second angle relative to the center axis;

the first angle and the second angle are within negative 35 degrees and negative 55 degrees relative to the center axis, and wherein the third angle is within positive 35 degrees and positive 55 degrees relative to the center axis; and/or a redundant coupling comprising: a bellows coupling comprising: a first tubular hub extending on the center axis; a second tubular hub extending on the center axis; and a metal bellows extending axially from the first tubular hub to the second tubular hub; and the metallic coupling, wherein the metal bellows extends circumferentially around the first plurality of connectors and the second plurality of connectors, wherein the first cylindrical flange is connected to the first tubular hub, and wherein the second cylindrical flange is connected to the second tubular hub.

In another example, a coupling for a drive shaft includes a first cylindrical flange extending axially along a center axis and a second cylindrical flange extending axially along the center axis and spaced axially from the first cylindrical flange. The coupling includes a first layer of connectors and a second layer of connectors. Each connector in the first layer extends from the first cylindrical flange to the second cylindrical flange. The connectors in the first layer are spaced circumferentially apart from each other about the center axis. The connectors of the first layer spiral circumferentially in a first direction about the center axis as the connectors of the first layer extend from the first cylindrical flange to the second cylindrical flange. Each connector in the second layer extends from the first cylindrical flange to the second cylindrical flange. The connectors in the second layer are spaced circumferentially apart from each other about the center axis. The second layer of connectors is spaced radially inward from the first layer of connectors relative to the center axis. The connectors of the second layer spiral circumferentially in a second direction about the center axis as the connectors in the second layer extend from the first cylindrical flange to the second cylindrical flange. The second direction is symmetric to the first direction relative to the center axis.

The coupling of the preceding paragraph can optionally include, additionally and/or alternatively, any one or more of the following features, configurations and/or additional components:

the connectors of the first layer extend from the first cylindrical flange to the second cylindrical flange at a first angle relative to the center axis;

the connectors of the second layer extend from the first cylindrical flange to the second cylindrical flange at a second angle relative to the center axis; and/or the first angle is within positive 35 degrees and positive 55 degrees relative to the center axis, and wherein the second angle is within negative 35 degrees and negative 55 degrees relative to the center axis.

In another example, a method of manufacturing a coupling is disclosed. The method includes forming a first cylindrical flange extending axially along a center axis. A first plurality of connectors is additively manufactured onto the first cylindrical flange in a build direction parallel to the center axis such that each connector of the first plurality of connectors spirals in a first direction relative to the center axis. A second plurality of connectors is additively manufactured onto the first cylindrical flange in the build direction such that each connector of the second plurality of connectors spirals in a second direction relative to the center axis. The second direction is symmetrical to the first direction. Each connector of the first plurality of connectors and each connector of the second plurality of connectors is connected to a second cylindrical flange.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A metallic coupling for a drive shaft comprising:
a first cylindrical flange, wherein the first cylindrical flange is tubular and extends axially along a center axis from a first end to a second end, wherein the second end of the first cylindrical flange is thicker than the first end;
a second cylindrical flange, wherein the second cylindrical flange is tubular and extends axially along the center axis from a first end of the second cylindrical flange to a second end of the second cylindrical flange, wherein the first end of the second cylindrical flange is thicker than the second end of the second cylindrical flange, and is spaced axially from the first cylindrical flange;
a first plurality of connectors, wherein each connector of the first plurality of connectors extends from the second end of the first cylindrical flange to the first end of the second cylindrical flange, the connectors of the first plurality of connectors are spaced circumferentially apart from each other about the center axis, and the first plurality of connectors is integral with the first cylindrical flange and the second cylindrical flange;
a second plurality of connectors, wherein each connector of the second plurality of connectors extends from the second end of the first cylindrical flange to the first end of the second cylindrical flange, wherein the connectors of the second plurality of connectors are spaced circumferentially apart from each other about the center axis, wherein the second plurality of connectors are radially inward from the first plurality of connectors relative to the center axis, and the second plurality of connectors is integral with the first cylindrical flange and the second cylindrical flange; and
an annular gap positioned radially between the first plurality of connectors and the second plurality of connectors.

2. The metallic coupling of claim 1, wherein the connectors of the first plurality of connectors are arranged spirally in a first spiral direction about the center axis as the connectors of the first plurality of connectors extend from the first cylindrical flange to the second cylindrical flange.

3. The metallic coupling of claim 2, wherein the connectors of the second plurality of connectors are arranged spirally in a second spiral direction about the center axis as the connectors of the second plurality of connectors extend from the first cylindrical flange to the second cylindrical flange, and wherein the second direction is symmetric with respect to the first direction relative to the center axis.

4. The metallic coupling of claim 3, wherein the connectors of the first plurality of connectors extend from the first cylindrical flange to the second cylindrical flange at a first angle relative to the center axis.

5. The metallic coupling of claim 4, wherein the connectors of the second plurality of connectors extend from the first cylindrical flange to the second cylindrical flange at a second angle relative to the center axis.

6. The metallic coupling of claim 5, wherein the first angle is within positive 35 degrees and positive 55 degrees relative to the center axis.

7. The metallic coupling of claim 6, wherein the second angle is within negative 35 degrees and negative 55 degrees relative to the center axis.

8. The metallic coupling of claim 7, wherein the first angle is positive 45 degrees and the second angle is negative 45 degrees.

9. The metallic coupling of claim 1, further comprising:
a third plurality of connectors, wherein each connector of the third plurality of connectors extends from the first cylindrical flange to the second cylindrical flange, the connectors of the third plurality of connectors are spaced circumferentially apart from each other about the center axis, wherein the third plurality of connectors are radially inward from the first plurality of connectors relative to the center axis, and wherein the third plurality of connectors are radially outward from the second plurality of connectors relative to the center axis; and
a second annular gap positioned radially between the second plurality of connectors and the third plurality of connectors, and wherein the annular gap is positioned radially between the first plurality of connectors and the third plurality of connectors.

10. The metallic coupling of claim 9, wherein the connectors of the third plurality of connectors are arranged spirally in a first spiral direction about the center axis as the connectors of the third plurality of connectors extend from the first cylindrical flange to the second cylindrical flange, wherein the connectors of the first plurality of connectors are arranged spirally in a second spiral direction about the center axis as the connectors of the first plurality of connectors extend from the first cylindrical flange to the second cylindrical flange, and wherein the second direction is opposite to the first direction about the center axis.

11. The metallic coupling of claim 10, wherein the connectors of the second plurality of connectors are arranged spirally in the second spiral direction about the center axis as the connectors of the second plurality of connectors extend from the first cylindrical flange to the second cylindrical flange.

12. The metallic coupling of claim 11, wherein the connectors of the first plurality of connectors extend from the first cylindrical flange to the second cylindrical flange at a first angle relative to the center axis, wherein the connectors of the second plurality of connectors extend from the first cylindrical flange to the second cylindrical flange at a second angle relative to the center axis, and wherein the connectors of the third plurality of connectors extend from the first cylindrical flange to the second cylindrical flange at a third angle relative to the center axis.

13. The metallic coupling of claim 12, wherein the first angle and the second angle both have the same sign relative to the center axis, and wherein the third angle has a sign opposite to the first angle and the second angle relative to the center axis.

14. The metallic coupling of claim 13, wherein the first angle and the second angle are within negative 35 degrees and negative 55 degrees relative to the center axis, and wherein the third angle is within positive 35 degrees and positive 55 degrees relative to the center axis.

15. A redundant coupling comprising:
a bellows coupling comprising:

a first tubular hub extending on the center axis;

a second tubular hub extending on the center axis; and a metal bellows extending axially from the first tubular hub to the second tubular hub; and the metallic coupling of claim 1, wherein the metal bellows extends circumferentially around the first plurality of connectors and the second plurality of connectors, wherein the first cylindrical flange is connected to the first tubular hub, and wherein the second cylindrical flange is connected to the second tubular hub.

16. A coupling for a drive shaft comprising:

a first cylindrical flange extending axially along a center axis;

a second cylindrical flange extending axially along the center axis and spaced axially from the first cylindrical flange;

a first layer of connectors, wherein each connector in the first layer extends from the first cylindrical flange to the second cylindrical flange, wherein each connector in the first layer is integrally connected with the first cylindrical flange and the second cylindrical flange, wherein the connectors in the first layer are spaced circumferentially apart from each other about the center axis, and wherein the connectors of the first layer spiral circumferentially in a first direction about the center axis as the connectors of the first layer extend from the first cylindrical flange to the second cylindrical flange;

a second layer of connectors, wherein each connector in the second layer extends from the first cylindrical flange to the second cylindrical flange, wherein each connector in the second layer is integrally connected with the first cylindrical flange and the second cylindrical flange, wherein the connectors in the second layer are spaced circumferentially apart from each other about the center axis, wherein the second layer of connectors is spaced radially inward from the first layer of connectors relative to the center axis, wherein the connectors of the second layer spiral in a second direction about the center axis as the connectors in the second layer extend from the first cylindrical flange to the second cylindrical flange, and wherein the second direction is symmetric to the first direction relative to the center axis.

17. The coupling of claim 16, wherein the connectors of the first layer extend from the first cylindrical flange to the second cylindrical flange at a first angle relative to the center axis.

18. The coupling of claim 17, wherein the connectors of the second layer extend from the first cylindrical flange to the second cylindrical flange at a second angle relative to the center axis.

19. The coupling of claim 18, wherein the first angle is within positive 35 degrees and positive 55 degrees relative to the center axis, and wherein the second angle is within negative 35 degrees and negative 55 degrees relative to the center axis.

20. The coupling of claim 16, further comprising:

a first tubular hub extending circumferentially around the first cylindrical flange and connected to the first cylindrical flange;

a second tubular hub extending circumferentially around the second cylindrical flange and connected to the second cylindrical flange; and a metal bellows extending axially from the first tubular hub to the second tubular hub, and wherein the metal bellows extends circumferentially around the first plurality of connectors and the second plurality of connectors.

* * * * *